US005500582A

United States Patent [19]

Owen

[11] Patent Number: 5,500,582

[45] Date of Patent: Mar. 19, 1996

[54] MULTIPHASE LOAD CONTROL SYSTEM WITH SWITCH CONNECTED SPLIT SOURCES OF PHASE VOLTAGE

[76] Inventor: Donald W. Owen, 5100 NW. 26th, Oklahoma City, Okla. 73127

[21] Appl. No.: 261,178

[22] Filed: Jun. 13, 1994

[51] Int. Cl.[6] .............................................. H02P 1/26

[52] U.S. Cl. .......................... 318/771; 318/780; 318/770; 318/781

[58] Field of Search .................................... 323/355, 358, 323/359, 361; 318/771, 780, 781, 770; 363/43

[56] References Cited

U.S. PATENT DOCUMENTS

| | | | |
|---|---|---|---|
| 1,993,794 | 3/1935 | Meyerhans | 171/119 |
| 2,464,061 | 3/1949 | Soley, Jr. | 171/95 |
| 2,812,488 | 11/1957 | Wright | 323/47 |
| 3,175,148 | 3/1965 | Swoish et al. | 323/43.5 |
| 3,349,320 | 10/1967 | Mathes | 323/43.5 |
| 3,484,727 | 12/1969 | Weber et al. | 336/147 |
| 3,624,471 | 11/1971 | Japp et al. | 318/225 R |
| 4,160,224 | 7/1979 | Owen | 336/147 |
| 4,255,734 | 3/1981 | Owen | 336/147 |
| 4,473,816 | 9/1984 | Perkins | 323/361 |
| 4,818,836 | 4/1989 | Bebber et al. | 323/355 |
| 5,130,616 | 7/1992 | Owen | 318/17 |
| 5,317,299 | 5/1994 | Dhyanchand et al. | 373/361 |
| 5,373,433 | 12/1994 | Thomas | 363/43 |

*Primary Examiner*—William M. Shoop, Jr.
*Assistant Examiner*—Karen Masih
*Attorney, Agent, or Firm*—Dougherty, Hessin, Beavers & Gilbert

[57] ABSTRACT

A multiphase load control system has switches in electrical series within each of several split sources of phase voltage. In each phase of one implementation, two contactor poles are in series between split sections of a secondary winding of a transformer. The contactor poles are part of one or more contactor units, each of which can have a voltage rating significantly less than the phase voltage provided by the system.

21 Claims, 6 Drawing Sheets

MULTIPHASE LOAD CONTROL SYSTEM WITH SWITCH CONNECTED SPLIT SOURCES OF PHASE VOLTAGE

BACKGROUND OF THE INVENTION

This invention relates generally to a multiphase load control system that provides phase voltages to a connected load via split voltage sources which are connected together or maintained disconnected through switches that are controlled to vary the application of the phase voltages to the load. In a particular aspect of the present invention the phase voltages, which are provided to a connected load when the switches connect the split sources, are greater than the voltages on the switch devices; therefore, the switch devices can have voltage ratings less than the phase voltages.

For proper operation of electrical systems, as with mechanical systems, components must be strong enough to withstand forces which will exist in the systems in which they are used. For example, an electrical component must be able to accommodate the electrical "pressure" (i.e., voltage) that can be applied to it within a particular system in which it is used. In at least alternating current (ac) systems, one measure of the "strength" of a component is indicated by its "voltage rating."

With regard to this voltage characteristic, a simple way to design an electrical system is to determine the maximum voltage and then select components which have voltage ratings at least as large as the maximum voltage. This, however, can be expensive. A conventional submersible pump system illustrates this.

In a submersible pump system, such as used in a well, a pump and a motor for driving the pump are located in the well. When the motor is a three-phase motor, three conductors are connected to the motor and extend out of the well to a motor control system at the surface. The motor control system provides a three-phase voltage through three output lines to which the conductors running into the well are connected. In one such motor control system, a respective switch is connected in electrical series in each output line. In this example, these switches are part of a device called a "contactor" which has "poles" implemented with relay coils and switch members; in this case, one three-pole contactor is used so that each pole is in a respective output line. These switches are closed and opened to control the application of voltage to the motor, thereby controlling whether the motor is on or off and thus also controlling the pump driven by the motor.

In the foregoing example, the contactor device needs to be rated for the full phase voltage that can be applied to the motor. Such a contactor device can be relatively expensive. For example, today's conventional contactor devices which have voltage ratings greater than 600 volts(RMS) are typically significantly more expensive than contactor devices rated for 600 volts or lower. Unfortunately, however, the phase voltages in many applications of the foregoing example are greater than 600 volts so that the more expensive contactor device rated above 600 volts is needed. It would be financially advantageous if a relatively high voltage system as described above could be implemented with lower voltage rated components, specifically the less expensive 600-volt rated contactor device.

SUMMARY OF THE INVENTION

The present invention overcomes the above-noted and other shortcomings of the prior art by providing a novel and improved multiphase load control system with switch connected split sources of phase voltage. This system provides higher output phase voltages than the switch devices need be rated for, thereby providing a less expensive system than one requiring higher voltage rated switch devices. In a particular embodiment, the present invention provides a three-phase motor control system.

Although the present invention is not limited to three-phase application, within this conventional and prevalent context the present invention provides a system for operating a three-phase load with a three-phase voltage up to a predetermined maximum voltage. This system comprises transformer means for providing a three-phase voltage not exceeding a predetermined maximum voltage. The transformer means includes: a first secondary winding having a first section and a second section therein; a second secondary winding having a first section and a second section therein; and a third secondary winding having a first section and a second section therein. The inventive system further comprises switch means, electrically connected between the first and second sections of each of the first, second and third secondary windings, for selectably connecting and disconnecting the first and second sections of the first, second and third secondary windings to close and open a drive circuit for a three-phase load connected to the second sections of the first, second and third secondary windings. The switch means preferably is rated for a maximum voltage less than the predetermined maximum voltage.

Specifically with regard to a three-phase motor control system, the present invention can be defined as comprising a three-phase motor and a transformer connected to the motor. In a preferred embodiment, the transformer includes both a first wye-connected secondary circuit having a neutral connection at the transformer and a second wye-connected secondary circuit having an effective neutral connection at the motor at least when the motor is not energized (this effective neutral is defined regardless of the winding configuration of the motor provided the motor winding configuration is one continuous circuit which provides a common point when no current is flowing). Such system further comprises contactor means for electrically connecting and disconnecting the first and second wye-connected secondary circuits to control the operation of the motor.

Within the broader multiphase context, the present invention can be defined as a multiphase load control system comprising: first phase voltage means for providing a first phase voltage, the first phase voltage means including a first voltage source and a second voltage source thereof; second phase voltage means for providing a second phase voltage, the second phase voltage means including a first voltage source and a second voltage source thereof; first first phase switch means, connected to the first voltage source of the first phase voltage means, for selectably defining one of a closed circuit and an open circuit in electrical series with the first and second voltage sources of the first phase voltage means; second first phase switch means, connected to the first first phase switch means and to the second voltage source of the first phase voltage means, for selectably defining one of a closed circuit and an open circuit in electrical series with the first and second voltage sources of the first phase voltage means; first second phase switch means, connected to the first voltage source of the second phase voltage means, for selectably defining one of a closed circuit and an open circuit in electrical series with the first and second voltage sources of the second phase voltage means; second second phase switch means, connected to the first second phase switch means and to the second voltage source of the second phase voltage means, for selectably defining one of a closed circuit and an open circuit in electrical series with the first and second voltage sources of the second phase voltage means; and means for connecting a multiphase load to the second voltage source of the first phase voltage means and to the second voltage source of the second phase voltage means.

Therefore, from the foregoing, it is a general object of the present invention to provide a novel and improved multiphase load control system with switch connected split sources of phase voltage. Other and further objects, features and advantages of the present invention will be readily apparent to those skilled in the art when the following description of the preferred embodiments is read in conjunction with the accompanying drawings.

DETAILED DESCRIPTION OF PREFERRED EMBODIMENTS

As used in the following description of the present invention and in the accompanying claims, "voltage" and specific voltages refer to alternating current voltage and specifically root-mean-square (RMS) values.

Although the present invention is not so limited, for convenience the present invention will be described with regard to a system for operating a three-phase load, specifically a three-phase motor 2 such as used for driving a submersible pump. The load is operated with a three-phase voltage up to a predetermined maximum voltage which has a significance as subsequently explained.

Figure 1:
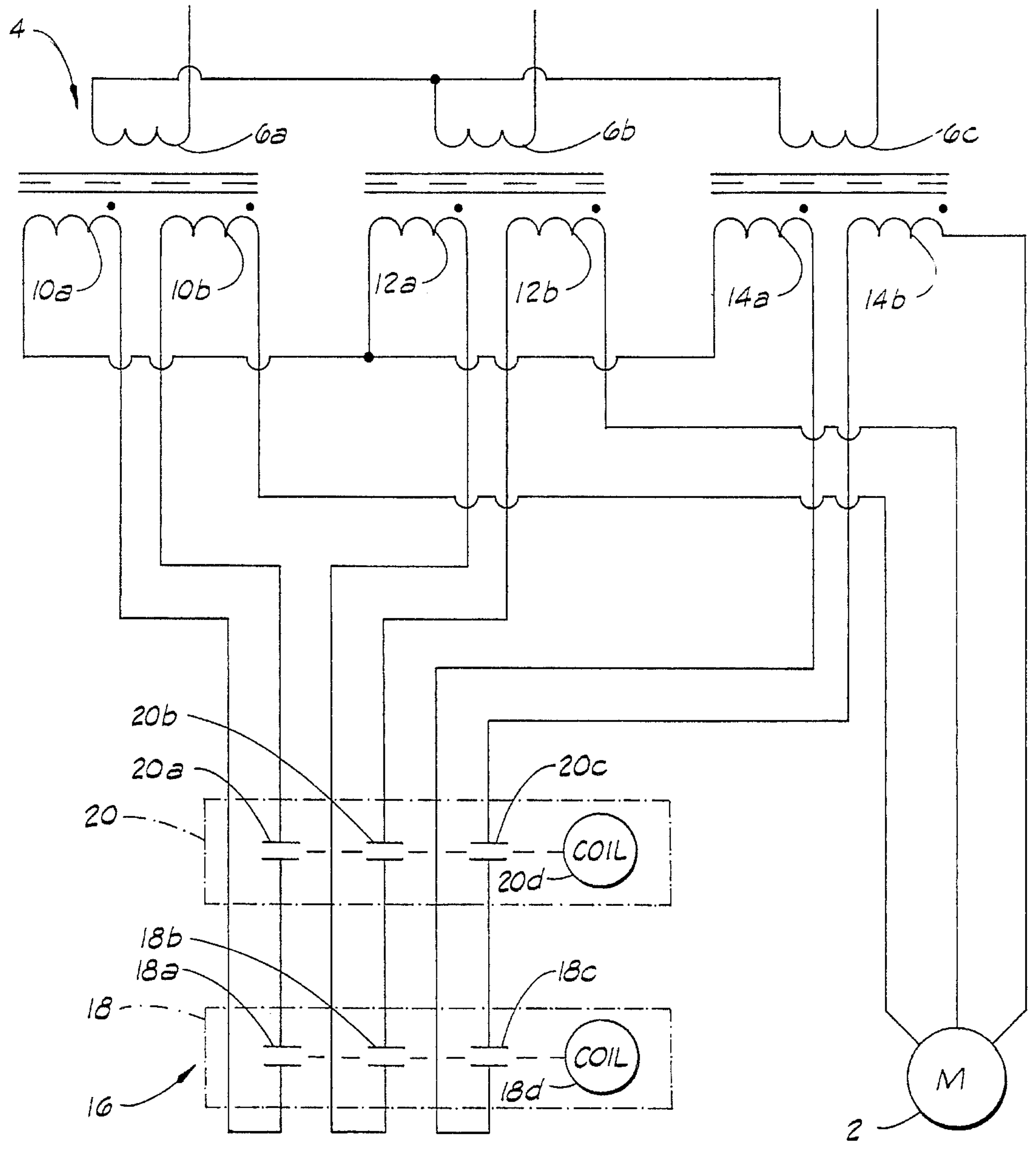
FIG. 1 is a schematic circuit diagram of a preferred embodiment of the multiphase load control system of the present invention.
Figure 2:
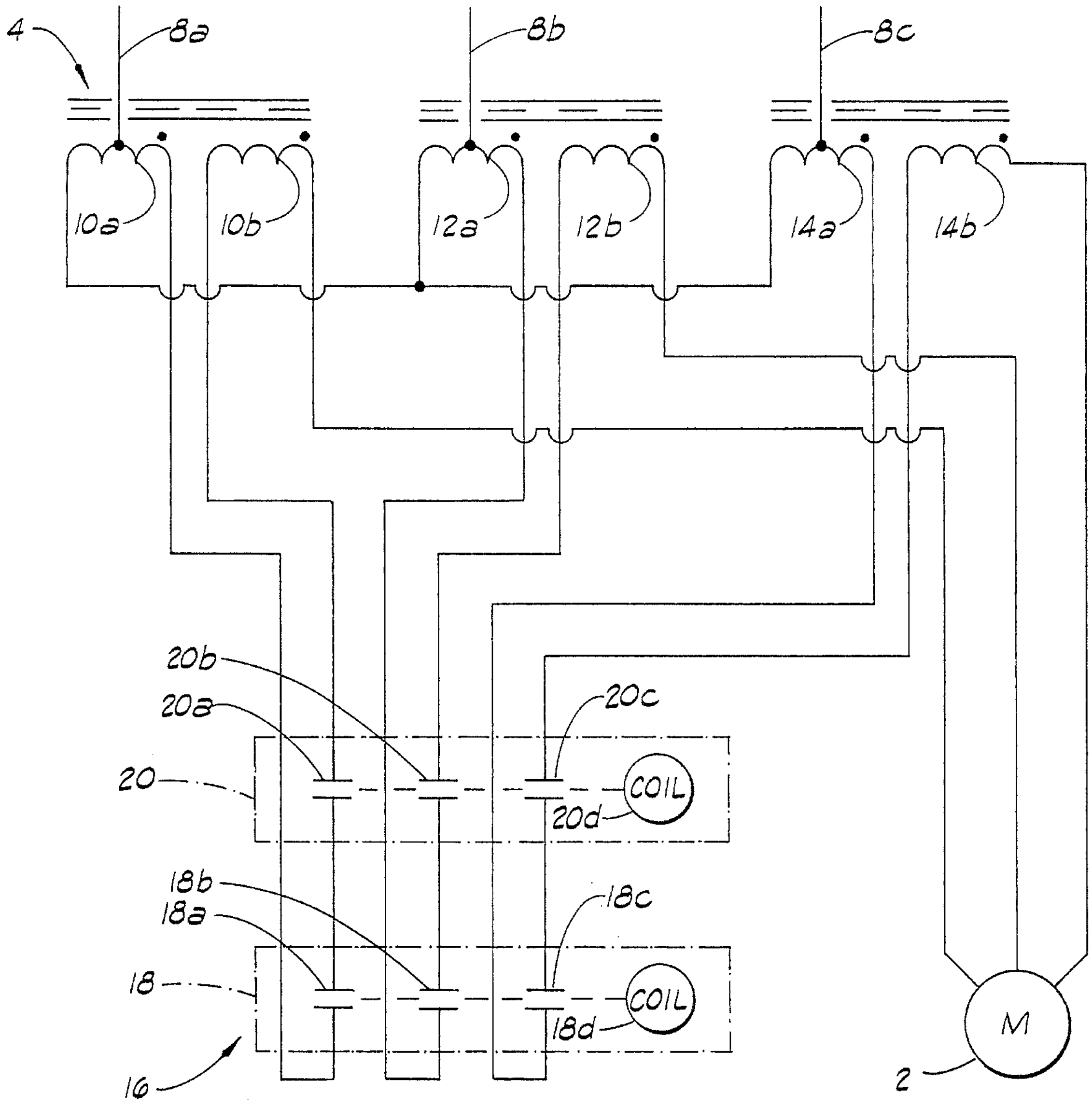
FIG. 2 is a schematic circuit diagram of another preferred embodiment of the multiphase load control system of the present invention.

Referring initially to FIG. 1, the system comprises transformer means 4 for providing a three-phase voltage not exceeding the predetermined maximum voltage. The portion of the transformer means 4 of particular significance to the present invention is the secondary circuit because the primary can be any suitable circuit having input connections as known in the art. For example, the primary can have isolated primary windings 6*a*, 6*b*, 6*c* connected in a wye configuration as shown in FIG. 1, or the primary circuit can have the autotransformer configuration with primary inputs 8*a*, 8*b*, 8*c* as shown in FIG. 2. The embodiments of FIGS. 1 and 2 are otherwise the same as indicated by like reference numerals used in the following description.

The secondary of both the FIG. 1 embodiment and the FIG. 2 embodiment contains three isolated secondary windings each having two respective isolated sections or subwindings. Each of the these sections is a respective voltage source in response to energization of the corresponding primary circuit.

More specifically, the secondary of the embodiments shown in FIGS. 1 and 2 includes a secondary winding having sections 10*a*, 10*b*; a secondary winding having sections 12*a*, 12*b*; and a secondary winding having sections 14*a*, 14*b*. These sections are wound in a conventional manner but so that they are isolated from each other. The present invention includes switch means 16 for selectably connecting and disconnecting these sections of the secondary windings to close and open a drive circuit for the load (the motor 2 in the illustrated embodiments). In the present invention, voltage less than the full phase voltage acts on the switch means 16; therefore, the switch means 16 can be, and preferably is for the reasons given above, rated for a maximum voltage less than the predetermined maximum voltage output by the transformer means 4. This voltage rating will be further explained below after first more specifically explaining the connections between the secondary windings and the switch means.

In the embodiments of FIGS. 1 and 2, the switch means 16 is defined by two three-pole contactor units 18, 20. The contactor unit 18 is conventional and has three "poles" or relay switch contacts 18*a*, 18*b*, 18*c* that respond to energization and deenergization of a coil 18*d*. Two respective power terminals are associated with each of the relay poles 18*a*, 18*b*, 18*c* on the outside of the housing of the contactor unit 18. The contactor unit 20 is the same; it has relay contact elements 20*a*, 20*b*, 20*c* actuated by a coil 20*d*. These switch elements of the two contactor units 18, 20 are connected into the secondary circuit as follows.

Like polarity ends of the sections 10*a*, 12*a*, 14*a* of the secondary windings of the transformer 4 are connected together to define a neutral point and a wye connection of these sections.

The other end of the section 10*a* is connected to one main power terminal of the contactor unit 18 associated with the pole 18*a*. The other main power terminal associated with the pole 18*a* of the contactor unit 18 is connected to one of the main power terminals connected to the pole 20*a* of the contactor unit 20. The other main power terminal of the pole 20*a* of the contactor unit 20 is connected to the end of the section 10*b* having an opposite polarity to the polarity of the end of the section 10*a* connected to the contactor unit 18. Thus, the sections 10*a*, 10*b* of the same secondary winding are connected in electrical series to define a complete secondary providing the desired phase voltage when the switches 18*a*, 20*a* of the contactor units 18, 20 are closed.

The other end of the section 10*b* is connected to the load, which is the motor 2 in the illustrated embodiment. The connection between the section 10*b* and the motor 2 of these preferred embodiments is shown in FIGS. 1 and 2 as being "direct" in that no contacts or switches are used. That is, the motor 2 is connected in a fixed electrical relationship to the respective secondary winding in these two embodiments.

The other two secondary windings are connected in this same manner to the respective poles of the contactor units 18, 20 and to the motor 2 as shown in FIGS. 1 and 2.

Figure 3:
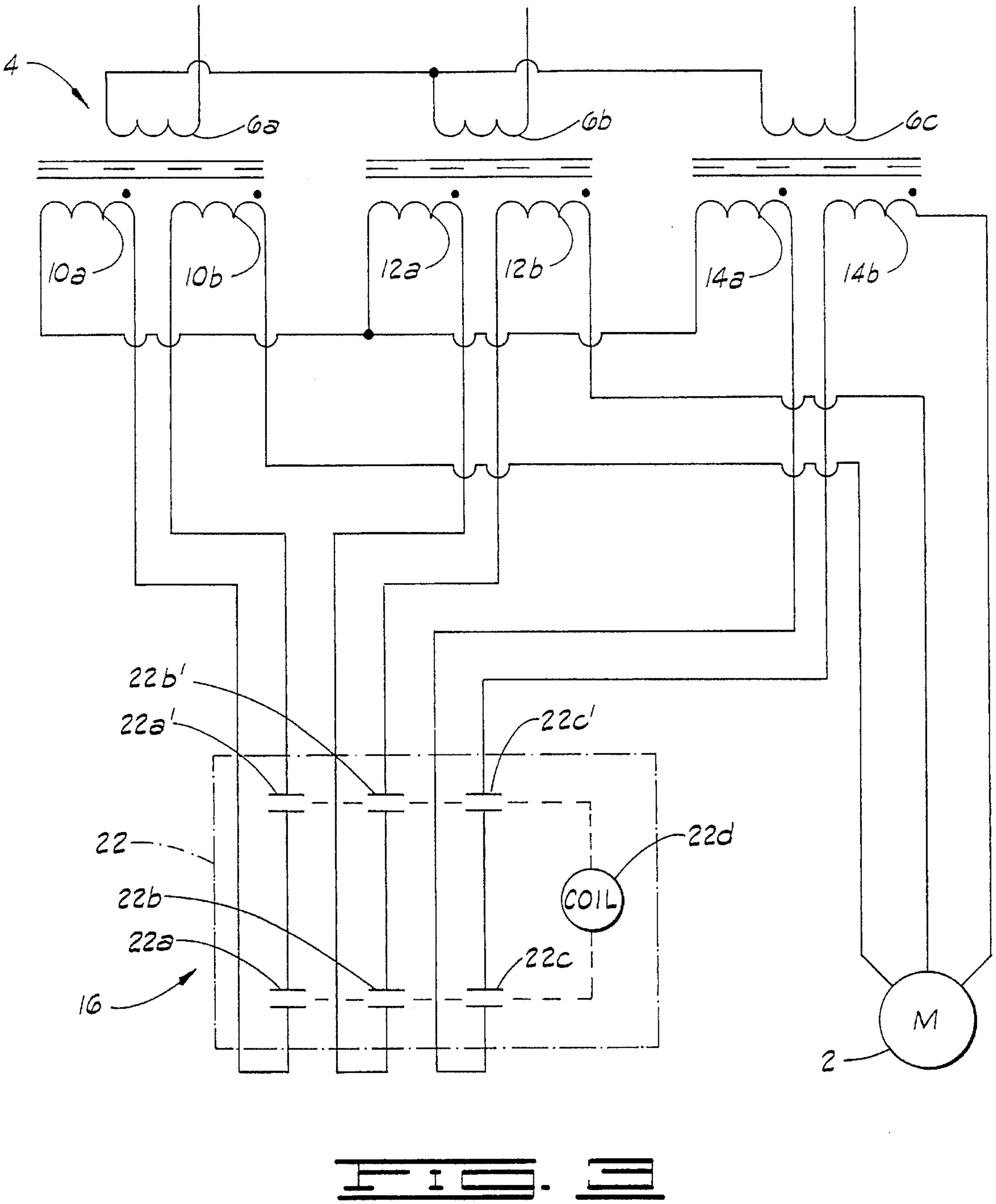
FIG. 3 is a schematic circuit diagram of a further preferred embodiment of the multiphase load control system of the present invention.

Another embodiment of the present invention is shown in FIG. 3. This embodiment is the same as shown in FIG. 1 except that the switch means 16 is implemented by a single six-pole contactor unit 22. Within the one housing of the single contactor unit 22 there are three pairs of relay contactor elements 22*a*–22*a'*, 22*b*–22*b'*, 22*c*–22*c'* which are commonly operated by a coil 22*d*. Each of the pairs of relay contactor elements is connected in series with the two sections of a respective secondary winding in the same manner as described above with reference to FIGS. 1 and 2.

Figure 4:
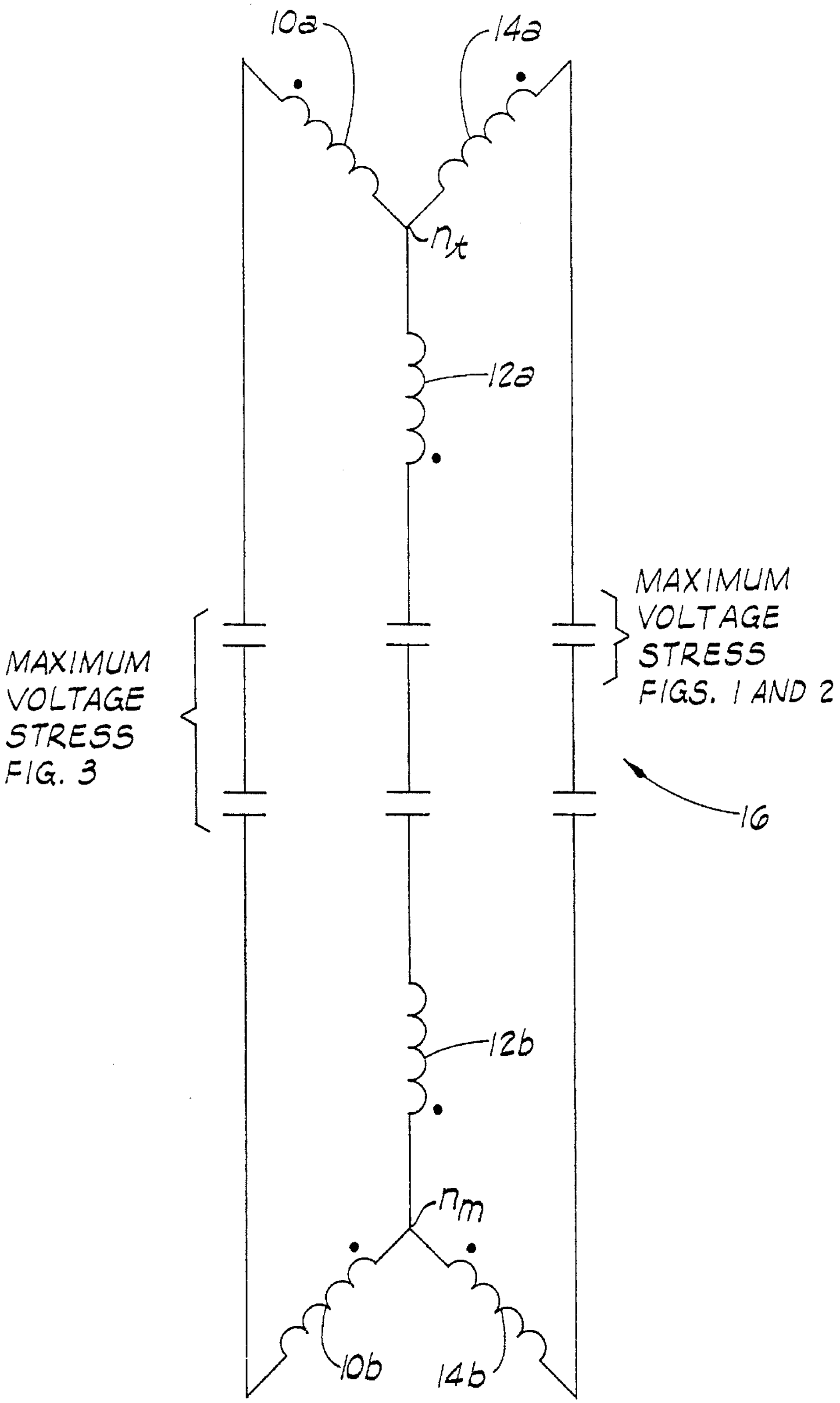
FIG. 4 is a schematic circuit diagram showing a circuit structure for a transformer secondary and a motor applicable to each of the embodiments of FIGS. 1–3.

A schematic circuit diagram applicable to each of the embodiments shown in FIGS. 1, 2 and 3 is shown in FIG. 4. The circuit of FIG. 4 shows that the sections 10*a*, 12*a*, 14*a* of the embodiments of FIGS. 1–3 define a wye-connected secondary circuit having a neutral connection (nt) at the transformer 4. These embodiments also have a wye-connected secondary circuit effectively having a neutral connection (nm) at the motor 2 when the switch elements are open. The interposed one or more contactor units of these embodiments thus electrically connect or disconnect these two wye-connected secondary circuits depending upon whether the respective contactor elements are closed or open. Refer to this diagram during the following explanation of differences between the two contactor unit embodiments of FIGS. 1 and 2 and the single contactor unit embodiment of FIG. 3.

In a specific implementation, the embodiments of FIGS. 1 and 2 can be used to operate the motor 2 at a phase voltage (i.e., line-to-line voltage at the motor 2) of 1200 volts (or lower) when the switch elements of the contactor units 18, 20 are closed. For this, the voltage provided across each section (i.e., a respective neutral-to-line voltage within one of the wye-connected circuits) of each of the split output secondary windings must be 346.41 volts or less. This produces a maximum of 600 volts line-to-line within each wye-connected circuit (e.g., as measured from the non-neutral end of section 10*a* to the non-neutral end of section 12*a*). Thus, even at a phase voltage of 1200 volts, there is no more than 600 volts stress between any two points on the surface or within the body of either contactor unit 18, 20 regardless of whether the switch elements of the contactor units are open or closed.

As to a specific implementation of the circuit of FIG. 3, it can be used to operate the motor 2 at a phase voltage of 1039 volts (or lower) without having more than 600 volts stress between any two points on the surface or within the body of the contactor unit 22, regardless of whether the switch elements are open or closed. For this, the voltage provided across each section of each of the split output secondary windings must be 300 volts or less (neutral-to-line within a wye-connected circuit). This produces a maximum of 519.62 volts line-to-line within each wye-connected circuit.

The difference between the maximum phase voltages that can be accommodated as described above occurs because in the embodiments of FIGS. 1 and 2 the maximum voltage stress on each contactor unit occurs during the open switch condition and is measured between only one of the wye-connected circuits and an electrically floating point connecting the two contactor units (i.e., across each switch element per phase), whereas in the embodiment of FIG. 3 this voltage stress is between both wye-connected circuits (i.e., across both switch elements per phase). However, a benefit of all three of these circuits of FIGS. 1–3 is that commercially available 600 volt rated contactor units can be used, and they are often substantially less costly than commercially available contactors rated above 600 volts.

Figure 5:
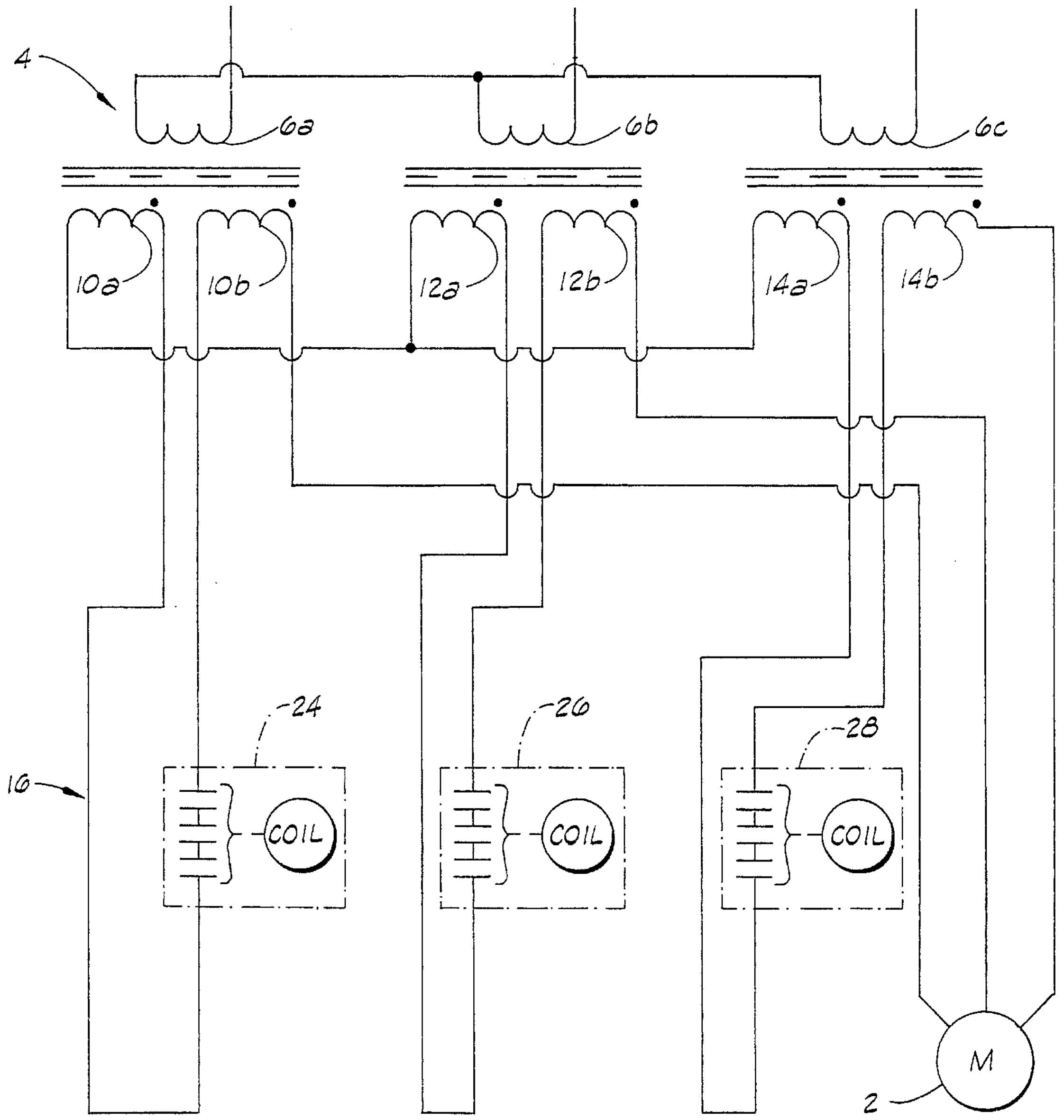
FIG. 5 is a schematic circuit diagram of still another preferred embodiment of the multiphase load control system of the present invention.

Referring to FIG. 5, still another embodiment of the present invention is illustrated. This embodiment is shown to be the same as that of FIG. 1 except that three three-pole contactor units are used with each contactor unit dedicated to a respective secondary winding. That is, a contactor unit 24 has its three poles connected in electrical series with secondary winding sections 10*a*, 10*b*; a contactor unit 26 has its three poles connected in series between secondary winding sections 12*a*, 12*b*; and a contactor unit 28 has its three poles connected in electrical series with secondary winding sections 14*a*, 14*b*.

A specific implementation of the circuit of FIG. 5 can be used to operate the motor 2 at a phase voltage of 2078 volts (or lower) without having more than 600 volts stress between any two points on the surface or within the body of any of the contactor units 24, 26, 28, regardless of whether the contactor switch elements are open or closed. For this, the neutral-to-line (internal) voltage provided across each section of each of the split output secondary windings must be 600 volts or less. This circuit has the same benefit as the others in that less expensive commercially available 600 volt rated contactor units can be used.

Any of the embodiments shown in FIGS. 1–5 can be used in any suitable manner. A non-limiting example is illustrated in FIG. 6, which is a one-line schematic that does not show the detail of FIGS. 1–6 but is representative.

Figure 6:
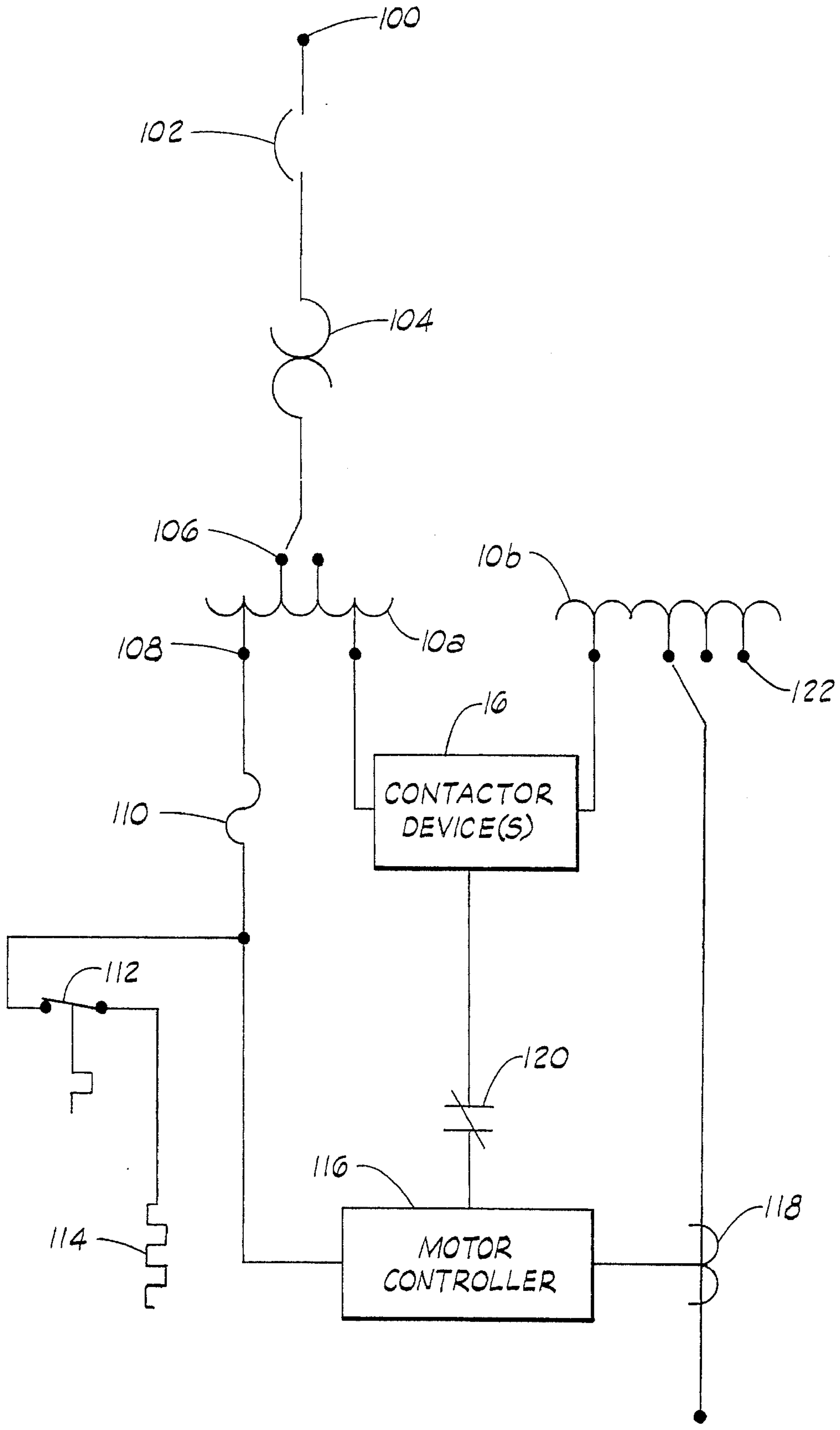
FIG. 6 is a one line schematic representing the present invention in a motor control system.

The application of FIG. 6 provides an input 100 representing one phase of a three-phase power supply. This is communicated through a magnetic only breaker 102 and an overload relay 104 to a selected input tap 106 in an autotransformer configuration of the present invention (such as illustrated in FIG. 2). This connection is made to secondary winding section 10*a* (as chosen for the single line drawing of FIG. 6). In the application of FIG. 6, the section 10*a* provides a control voltage through a tap 108 connected through a control fuse 110 to a thermostat 112 and a space heater 114 as well as to a motor controller 116. The motor controller 116 is responsive to output current as sensed by a current transformer 118. In response to the sensed current from the transformer(s) 118 and the energization from the secondary winding section(s) through the tap(s) 108, the motor controller 116 provides a control signal through an overload relay 120 to the respective coil of the one or more contactor devices described above with reference to FIGS. 1–5. As shown in FIG. 6, the contactor device or devices connect the section 10*a* to the section 10*b* (as well as the other sections not specifically identified in FIG. 6). From section 10*b*, the output is provided in the preferably fixed electrical relationship referred to above; however, this output can also be switchable through output taps 122.

The operation of the motor controller 116 and its effect on the output occur as known in the art.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. A system for operating a three-phase load with a three-phase voltage up to a predetermined maximum voltage, said system comprising:

transformer means for providing a three-phase voltage not exceeding a predetermined maximum voltage, said transformer means including:

a first secondary winding having a first section and a second section therein;

a second secondary winding having a first section and a second section therein; and a third secondary winding having a first section and a second section therein; and switch means, electrically connected between said first and second sections of each of said first, second and third secondary windings, for selectably connecting and disconnecting said first and second sections of said first, second and third secondary windings to close and open a drive circuit for a three-phase load connected to said second sections of said first, second and third secondary windings.

2. A system as defined in claim 1, wherein voltage on said switch means is less than said predetermined maximum voltage regardless of whether said drive circuit is closed or open.

3. A system as defined in claim 2, wherein said switch means is rated for a maximum voltage less than said predetermined maximum voltage.

4. A system as defined in claim 1, wherein said switch means includes:

a first three-pole contactor unit having each pole thereof connected to a respective one of said first sections of said first, second and third secondary windings; and a second three-pole contactor unit having each pole thereof connected to a respective one of said second sections of said first, second and third secondary windings and to a respective one of the poles of said first three-pole contactor unit.

5. A system as defined in claim 4, wherein each of said contactor units is rated for a maximum voltage of 600 volts.

6. A system as defined in claim 1, wherein said switch means includes a six-pole contactor unit having three pairs of contactors, each of said pairs connected in electrical series between said first and second sections of a respective one of said first, second and third secondary windings.

7. A system as defined in claim 6, wherein said contactor unit is rated for a maximum voltage of 600 volts.

8. A system as defined in claim 1, wherein said switch means includes:

a first three-pole contactor unit having the poles thereof connected in electrical series between said first and second sections of said first secondary winding;

a second three-pole contactor unit having the poles thereof connected in electrical series between said first and second sections of said second secondary winding; and a third three-pole contactor unit having the poles thereof connected in electrical series between said first and second sections of said third secondary winding.

9. A system as defined in claim 8, wherein each of said contactor units is rated for a maximum voltage of 600 volts.

10. A three-phase motor control system, comprising:

a three-phase motor;

a transformer connected to said motor, said transformer including:

a first wye-connected secondary circuit having a neutral connection at said transformer; and a second wye-connected secondary circuit having an effective neutral connection at said motor at least when said motor is not energized; and contactor means for electrically connecting and disconnecting said first and second wye-connected secondary circuits to control the operation of said motor.

11. A three-phase motor control system as defined in claim 10, wherein said contactor means includes:

a first three-pole contactor unit having each pole thereof connected to a respective line of said first wye-connected secondary circuit; and a second three-pole contactor unit having each pole thereof connected to a respective line of said second wye-connected secondary circuit and to a respective one of the poles of said first three-pole contactor unit.

12. A three-phase motor control system as defined in claim 11, wherein said transformer provides a maximum line-to-line voltage of 600 volts in each of said first and second wye-connected secondary circuits so that a maximum line-to-line voltage of 1200 volts is provided to said motor when said contactor means connects said first and second wye-connected secondary circuits through said first and second contactor units, and further wherein each of said contactor units is rated for a maximum voltage of 600 volts.

13. A three-phase motor control system as defined in claim 10, wherein said contactor means includes a six-pole contactor unit having three pairs of contactors, each of said pairs connected in electrical series between respective lines of said first and second wye-connected secondary circuits.

14. A three-phase motor control system as defined in claim 13, wherein said transformer provides a maximum neutral-to-line voltage of 300 volts in each of said first and second wye-connected secondary circuits so that a maximum line-to-line voltage of 1039 volts is provided to said motor when said contactor means connects said first and second wye-connected secondary circuits through said contactor unit, and further wherein said contactor unit is rated for a maximum voltage of 600 volts.

15. A three-phase motor control system as defined in claim 10, wherein said contactor means includes:

a first three-pole contactor unit having the poles thereof connected in electrical series between respective lines of said first and second wye-connected secondary circuits;

a second three-pole contactor unit having the poles thereof connected in electrical series between respective lines of said first and second wye-connected secondary circuits; and a third three-pole contactor unit having the poles thereof connected in electrical series between respective lines of said first and second wye-connected secondary circuits.

16. A three-phase motor control system as defined in claim 15, wherein said transformer provides a maximum neutral-to-line voltage of 600 volts in each of said first and second wye-connected secondary circuits so that a maximum line-to-line voltage of 2078 volts is provided to said motor when said contactor means connects said first and second wye-connected secondary circuits through said first, second and third contactor units, and further wherein each of said contactor units is rated for a maximum voltage of 600 volts.

17. A multiphase load control system, comprising:

first phase voltage means for providing a first phase voltage, said first phase voltage means including a first voltage source and a second voltage source thereof;

second phase voltage means for providing a second phase voltage, said second phase voltage means including a first voltage source and a second voltage source thereof;

first first phase switch means, connected to said first voltage source of said first phase voltage means, for selectably defining one of a closed circuit and an open circuit in electrical series with said first and second voltage sources of said first phase voltage means;

second first phase switch means, connected to said first first phase switch means and to said second voltage source of said first phase voltage means, for selectably defining one of a closed circuit and an open circuit in electrical series with said first and second voltage sources of said first phase voltage means;

first second phase switch means, connected to said first voltage source of said second phase voltage means, for selectably defining one of a closed circuit and an open circuit in electrical series with said first and second voltage sources of said second phase voltage means;

second second phase switch means, connected to said first second phase switch means and to said second voltage source of said second phase voltage means, for selectably defining one of a closed circuit and an open circuit in electrical series with said first and second voltage sources of said second phase voltage means; and means for connecting a multiphase load to said second voltage source of said first phase voltage means and to said second voltage source of said second phase voltage means.

18. A multiphase load control system as defined in claim 17, wherein:

said first voltage source and said second voltage source of said first phase voltage means include respective isolated sections of a first secondary winding of a transformer;

said first voltage source and said second voltage source of said second phase voltage means include respective isolated sections of a second secondary winding of said transformer;

said first and second first phase switch means are connected between an end of one of said sections of said first secondary winding and an end of the other of said sections of said first secondary winding, said ends of said first secondary winding sections being of opposite polarities; and said first and second second phase switch means are connected between an end of one of said sections of said second secondary winding and an end of the other of said sections of said second secondary winding, said ends of said second secondary winding sections being of opposite polarities.

19. A multiphase load control system as defined in claim 18, wherein:

said first first phase switch means and said first second phase switch means are embodied within an electrically operated first contactor unit; and said second first phase switch means and said second second phase switch means are embodied within an electrically operated second contactor unit.

20. A multiphase load control system as defined in claim 18, wherein all of said phase switch means are embodied in one electrically operated contactor unit.

21. A multiphase load control system as defined in claim 18, wherein:

said first first phase switch means and said second first phase switch means are embodied within an electrically operated first contactor unit; and said first second phase switch means and said second second phase switch means are embodied within an electrically operated second contactor unit.

* * * * *